(12) United States Patent
Shao

(10) Patent No.: US 11,010,404 B2
(45) Date of Patent: *May 18, 2021

(54) DATA SYNCHRONIZATION METHOD, APPARATUS, AND SYSTEM

(71) Applicant: Advanced New Technologies Co., Ltd., George Town (KY)

(72) Inventor: Shuai Shao, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 159 days.

This patent is subject to a terminal disclaimer.

(21) Appl. No.: 16/037,785

(22) Filed: Jul. 17, 2018

(65) Prior Publication Data

US 2018/0341693 A1 Nov. 29, 2018

Related U.S. Application Data

(63) Continuation of application No. PCT/CN2017/070648, filed on Jan. 9, 2017.

(30) Foreign Application Priority Data

Jan. 18, 2016 (CN) .......................... 201610031809.X

(51) Int. Cl.
*G06F 16/27* (2019.01)
*G06F 16/23* (2019.01)
*G06F 16/2455* (2019.01)

(52) U.S. Cl.
CPC .......... *G06F 16/27* (2019.01); *G06F 16/2358* (2019.01); *G06F 16/24552* (2019.01)

(58) Field of Classification Search
None
See application file for complete search history.

(56) References Cited

U.S. PATENT DOCUMENTS

| 6,792,436 | B1 | 9/2004 | Zhu et al. |
| 7,162,472 | B2 | 1/2007 | Galindo-Legaria et al. |
| 2006/0271557 | A1* | 11/2006 | Harward .................... G06F 9/52 |
| 2010/0100641 | A1* | 4/2010 | Quinlan .................... G06F 9/52 709/248 |
| 2010/0174679 | A1* | 7/2010 | Baynes, Jr. ............. H04L 29/06 707/617 |

(Continued)

FOREIGN PATENT DOCUMENTS

| CN | 101188566 | 5/2008 |
| CN | 101291342 | 10/2008 |

(Continued)

OTHER PUBLICATIONS

International Search Report by the International Searching Authority issued in International Application No. PCT/CN2017/070648 dated Apr. 11, 2017; 9 pages.

(Continued)

*Primary Examiner* — James Trujillo
*Assistant Examiner* — Michal Bogacki
(74) *Attorney, Agent, or Firm* — Fish & Richardson P.C.

(57) ABSTRACT

A determination is made, by a first device, that data in a first database is modified. The first database is associated with the first device. A notification is generated by the first device. The notification includes information associated with the data modification in the first database. The notification is transmitted by the first device to at least one second device. At least one second database is associated with the at least one second device.

18 Claims, 11 Drawing Sheets

(56) References Cited

U.S. PATENT DOCUMENTS

| | | | | |
|---|---|---|---|---|
| 2010/0235462 | A1* | 9/2010 | Ivanov | G06F 16/1865 709/217 |
| 2011/0055155 | A1* | 3/2011 | Page | G06F 8/658 707/625 |
| 2011/0161339 | A1 | 6/2011 | Ireland et al. | |
| 2012/0028660 | A1* | 2/2012 | Stafford | H04W 4/12 455/466 |
| 2014/0229435 | A1* | 8/2014 | Palivatkel | G06F 16/273 707/620 |
| 2014/0250073 | A1* | 9/2014 | Zalpuri | G06F 16/273 707/636 |
| 2014/0324785 | A1* | 10/2014 | Gupta | G06F 16/2358 707/689 |
| 2015/0242146 | A1 | 8/2015 | Shinozaki et al. | |
| 2015/0278245 | A1 | 10/2015 | Sagar et al. | |
| 2020/0125580 | A1 | 4/2020 | Shao | |

FOREIGN PATENT DOCUMENTS

| | | |
|---|---|---|
| CN | 102279880 | 12/2011 |
| CN | 102346740 | 2/2012 |
| CN | 103138912 | 6/2013 |
| CN | 103581262 | 2/2014 |
| CN | 102741843 | 3/2014 |
| JP | 2003131917 | 5/2003 |
| JP | 2010170485 | 8/2010 |
| JP | 2015162091 | 9/2015 |

OTHER PUBLICATIONS

International Preliminary Report on Patentability in International Application No. PCT/CN2017/070648 dated Jul. 24, 2018; 8 pages.
International Search Report and Written Opinion in International Application No. PCT/CN2017/070648 dated Apr. 11, 2017; 9 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Extended European Search Report in European Application No. 17740969.5, dated Jun. 3, 2019, 11 pages.

* cited by examiner ic # DATA SYNCHRONIZATION METHOD, APPARATUS, AND SYSTEM

CROSS-REFERENCE TO RELATED APPLICATIONS

This application is a continuation of PCT Application No. PCT/CN2017/070648, filed on Jan. 9, 2017, which claims priority to Chinese Patent Application No. 201610031809.X, filed on Jan. 18, 2016, and each application is hereby incorporated by reference in its entirety.

TECHNICAL FIELD

The present application relates to the field of database technologies, and in particular, to a data synchronization method, apparatus, and system.

BACKGROUND

In the big data era, data owners usually build more than two data centers for the purpose of disaster recovery. In a conventional cold standby disaster recovery solution, an active data center is used as a primary service, and other data centers are used to back up data in the active data center. A problem with this solution is that the active data center and a standby center cannot be directly reused, and the standby data center can function only in a disaster, resulting in low resource utilization. In addition, it is time-consuming and complicated for the standby data center to take over the active data center as the primary service, and it usually severely affects processing of a normal service.

A distributed multi-active data center (multi-active for short) technology is proposed for the problem with the cold standby technology. An implementation idea is as follows: there are no active and standby services in a plurality of data centers, the data centers cooperate with each other in normal mode, and provide a service for service access in parallel. This prevents standby data centers from being idle and doubles the service capability of the system. When one data center fails, other data centers can quickly take over all services.

In the multi-active solution, because data centers each have relatively equal footing, a requirement on speed of data synchronization between data centers is relatively high. Especially in an application scenario where data centers are deployed at different locations, improving the speed of data synchronization between two locations at a relatively long communication distance is a problem in current multi-active data center construction.

SUMMARY

To resolve the previous technical problem, the present application provides a data synchronization method, apparatus, and system. The technical solutions are as follows:

According to a first aspect of the present application, a data synchronization method is provided. The method includes the following: after determining that data of a source end database is modified, generating a real-time notification for this data modification by a data synchronization source end and sending the real-time notification to a data synchronization target end, where the real-time notification includes information related to this data modification; and after receiving the real-time notification, obtaining the data modification related information by parsing the real-time notification by the data synchronization target end and updating a cache in a target end database based on a parsing result.

According to a second aspect of the present application, a data synchronization method is provided. The method is applied to a data synchronization source end and includes the following: generating a real-time notification for this data modification after determining that data of a source end database is modified, where the real-time notification includes information related to this data modification; and sending the real-time notification to a data synchronization target end. Thus, after receiving the real-time notification, the data synchronization target end obtains the data modification related information by parsing the real-time notification and updates a cache in a target end database based on a parsing result.

According to a third aspect of the present application, a data synchronization method is provided. The method is applied to a data synchronization target end and includes the following: receiving a real-time notification sent by a data synchronization source end; obtaining data modification related information by parsing the real-time notification; and updating a cache in a target end database based on a parsing result. After the data synchronization source end determines that data of a source end database is modified, the real-time notification is generated and sent for this data modification, and the real-time notification includes information related to this data modification.

According to a fourth aspect of the present application, a data synchronization source end apparatus is provided. The apparatus includes a real-time notification generation module and a real-time notification sending module, where the real-time notification generation module is configured to generate a real-time notification for this data modification after it is determined that data of a source end database is modified, where the real-time notification includes information related to this data modification. Moreover, the real-time notification sending module is configured to send the real-time notification to a data synchronization target end. Thus, after receiving the real-time notification, the data synchronization target end obtains the data modification related information by parsing the real-time notification and updates a cache in a target end database based on a parsing result.

According to a fifth aspect of the present application, a data synchronization target end apparatus is provided. The apparatus includes a real-time notification receiving module and a cache data update module, where the real-time notification receiving module is configured to receive a real-time notification sent by a data synchronization source end. The cache data update module is configured to obtain data modification related information by parsing the real-time notification and update a cache in a target end database based on a parsing result. After the data synchronization source end determines that data of a source end database is modified, the real-time notification is generated and sent for this data modification, and the real-time notification includes information related to this data modification.

According to a sixth aspect of the present application, a data synchronization system is provided. The system includes a data synchronization source end apparatus and a data synchronization target end apparatus, where the data synchronization source end apparatus includes a real-time notification generation module and a real-time notification sending module. The real-time notification generation module is configured to generate a real-time notification for this data modification after it is determined that data of a source end database is modified, where the real-time notification includes information related to this data modification. The real-time notification sending module is configured to send the real-time notification to a data synchronization target end. The data synchronization target end apparatus includes a real-time notification receiving module and a cache data update module, where the real-time notification receiving module is configured to receive the real-time notification. The cache data update module is configured to obtain data modification related information by parsing the real-time notification and update a cache in a target end database based on a parsing result.

Based on the technical solutions provided in the present application, after modifying data, the data synchronization source end sends a real-time notification to the data synchronization target end. If the target end can directly update a cache in a local database based on information included in the real-time notification, the cache can be updated to reduce a cache synchronization update delay without waiting for completion of synchronization of an underlying database. If the target end cannot directly update a cache in a local database based on information included in the real-time notification, it can also be learned that the local database is to be synchronized and updated to reduce a cache synchronization update delay, so monitoring the local database can be further initiated to update cache data immediately after synchronization of local data is completed.

It should be understood that the previous general description and the following detailed description are merely examples and explanations and cannot limit the present application.

BRIEF DESCRIPTION OF DRAWINGS

To describe the technical solutions in the implementations of the present application or in the existing technology, the following briefly describes the accompanying drawings for describing the implementations or the existing technology. Apparently, the accompanying drawings in the following description merely show some implementations of the present application, and a person of ordinary skill in the art can still derive other drawings from these accompanying drawings.

DESCRIPTION OF IMPLEMENTATIONS

To enable a person skilled in the art to better understand the technical solutions in the present application, the following describes in detail the technical solutions in the implementations of the present application with reference to the accompanying drawings in the implementations of the present application. Apparently, the described implementations are merely some rather than all of the implementations of the present application. Other implementations obtained by a person of ordinary skill in the art based on the implementations of the present application shall fall within the protection scope of the present application.

Figure 1:
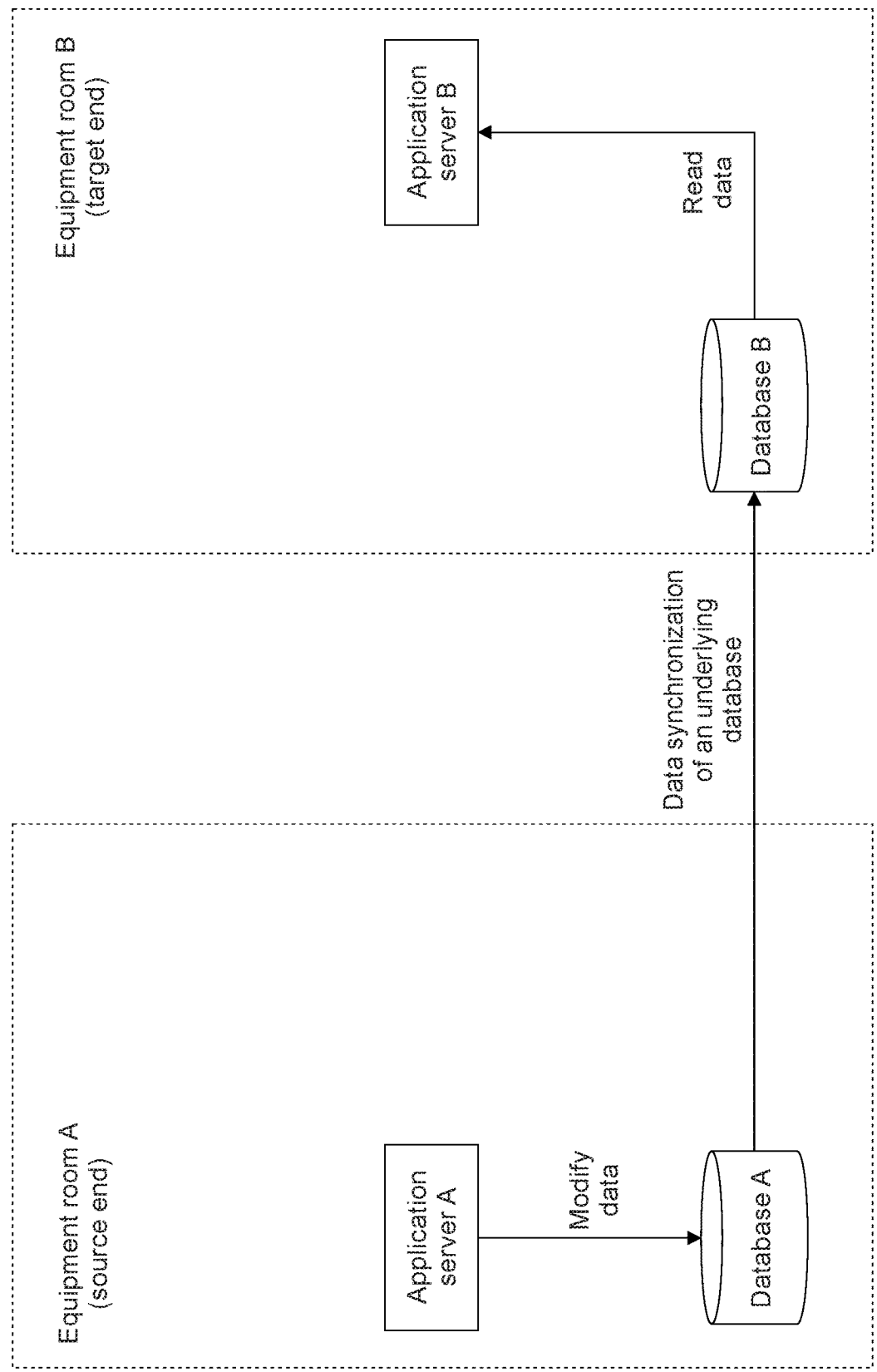
FIG. 1 is a first schematic structural diagram illustrating an active-active system in the existing technology.

First, a system architecture and working principle of a multi-active data center solution are briefly described. FIG. 1 is a schematic architectural diagram illustrating an active-active system. Two data centers are respectively installed in equipment room A and equipment room B. Database A and database B are respectively located in equipment room A and equipment room B. In each equipment room, an application server directly interacts with a database. The application server performs a read/write operation on a local database based on instructions sent by a user or other systems. Based on requirements of a multi-active system, if a database of an equipment room is modified, the modification needs to be synchronized to another equipment room as soon as possible. In a synchronization process, a database that is first modified is referred to as a source end database, and a database that is subsequently synchronized is referred to as a target end database.

The active-active system shown in FIG. 1 is used as an example. Based on a primitive data synchronization solution of an underlying database, if an application server A performs a write operation on database A, write events occurring on database A are sequentially packed. Then the packed events are input to database B in batches to perform data modification. After the modification is completed, an application server B can read data consistent with that in database A from database B.

Caching is a commonly used technology in database operations. Compared with a basic underlying database storage area, a cache has better data read/write performance and can avoid direct interaction between an application and an underlying database. For example, a relatively apparent feature of state-type data is that the data is read frequently and written infrequently. User information data is used as an example. After filling in personal information in a registration phase, a user is unlikely to frequently modify personal information. Based on such a feature, most systems use a layer of caches at an upper layer of the database to buffer a large number of data query requests, thereby reducing query requests actually sent to the databases and improving overall query performance of the systems.

Figure 2:
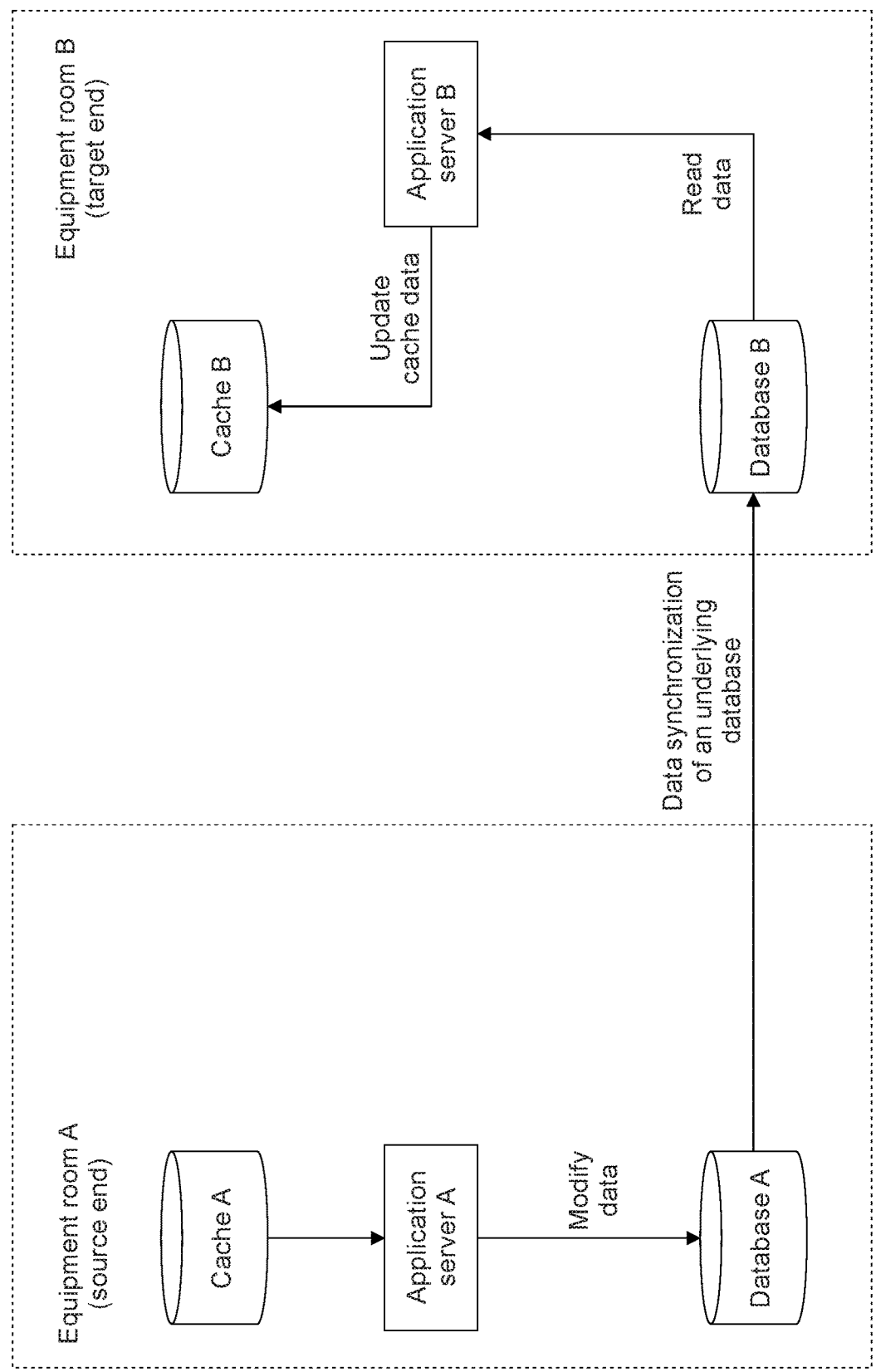
FIG. 2 is a second schematic structural diagram illustrating an active-active system in the existing technology.

A caching technology can also be applied to a multi-active system. As shown in FIG. 2, a layer of caches are disposed on an upper layer of a database, and commonly used data is put into a cache in advance. When an application server needs to use data, the application server needs to preferentially read data from the cache, thereby improving data read efficiency, avoiding direct interaction between the application server and an underlying database, and reducing a read/write burden on the underlying database.

After a caching mechanism is added, a cache becomes a primary source of data read by the application server. Therefore, when data synchronization is performed between data centers, a synchronization update problem of a cache in a target end equipment room needs to be considered so as to ensure accuracy of data query at a target end. The active-active system shown in FIG. 2 is used as an example. Based on an existing synchronization solution, if application server A performs a write operation on database A, both cache A and cache B need to be updated. Cache A is locally updated, and the existing technical solution can be directly used. No further description is provided. During the update of cache B, a data synchronization operation between database A and database B is first completed. Then application server B updates the local cache B based on the synchronized database B. In addition, in the active-active system, two databases can be deployed in equipment room A. One database is used as a write database, and the other database is used as a read database. A read database is deployed in another equipment room such as equipment room B. As such, data write operations are performed by using the write database in equipment room A. After data is written to the write database, the newly written data can be synchronized to the read database in the local equipment room and the read database in the other equipment room. As such, during a caching operation, data written into the write database needs to pass through read databases of equipment rooms before a corresponding cache is updated.

In an actual application, such a cache data synchronization method has at least two problems:

First, in the caching mechanism, the application server at the target end preferentially reads data from a cache so as to finally perform a synchronization update on cache data at the target end. Efficiency of serial data synchronization between underlying databases is relatively low, especially when data centers are deployed at different locations. As such, a delay is relatively high, and after cache update steps are added, the delay is further increased.

Second, the application server at the target end cannot actually sense an update of local underlying data and cannot update cache data immediately. Consequently, a delay is higher.

Data centers at different locations are used as an example. Two data centers are respectively deployed in two cities at a distance of 1000 km from each other. Tests show that a data synchronization delay between a write database and a remote read database is about 3 s. Therefore, if data at the two cities is synchronized by using a primitive data synchronization duplication solution of a database, the data can be synchronized within seconds. When a user writes data at a data center of one city, it is possible that a data center in the other city cannot immediately read the written data, and a user needs to retry several seconds later. Consequently, user experience is affected.

To resolve the previous problem, the present application provides a data synchronization method so as to reduce a synchronization update delay between database caches of data centers. The method includes the following steps:

After determining that data of a source end database is modified, a data synchronization source end generates a real-time notification for this data modification and sends the real-time notification to a data synchronization target end, where the real-time notification includes information related to this data modification. Thus, after receiving the real-time notification, the data synchronization target end obtains the data modification related information by parsing the real-time notification and updates a cache in a target end database based on a parsing result.

Figure 3:
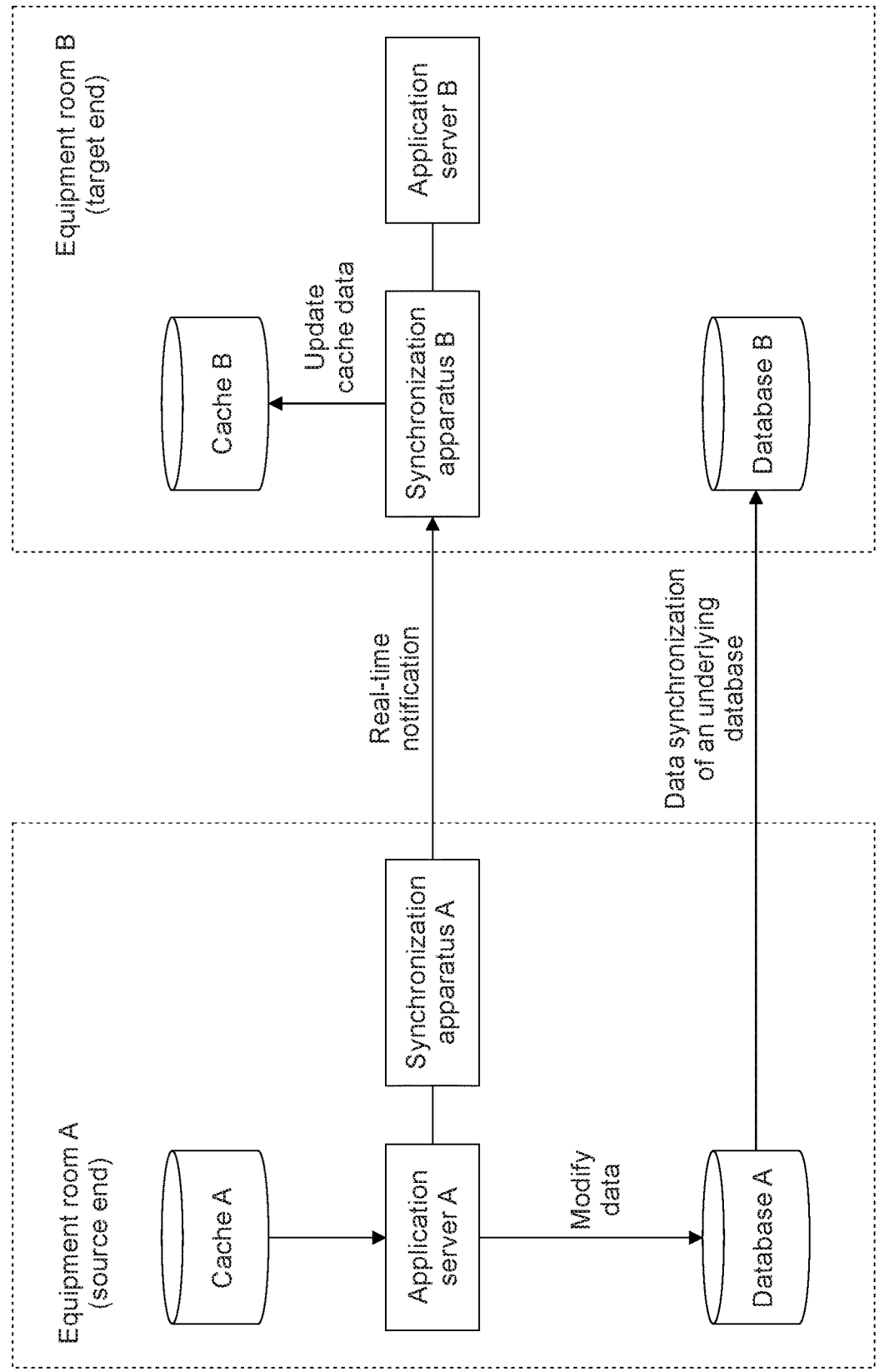
FIG. 3 is a first schematic structural diagram illustrating an active-active system according to the present application.

The method can be performed by synchronization apparatuses separately located at the data synchronization source end and the data synchronization target end. As shown in FIG. 3, synchronization apparatus A located at the data synchronization source end is communicatively connected to application server A. After it is determined that application server A performs a write operation on database A, synchronization apparatus A generates a real-time notification and sends the real-time notification to synchronization apparatus B located at the data synchronization target end; and synchronization apparatus B directly updates cache B based on the real-time notification.

Figure 4:
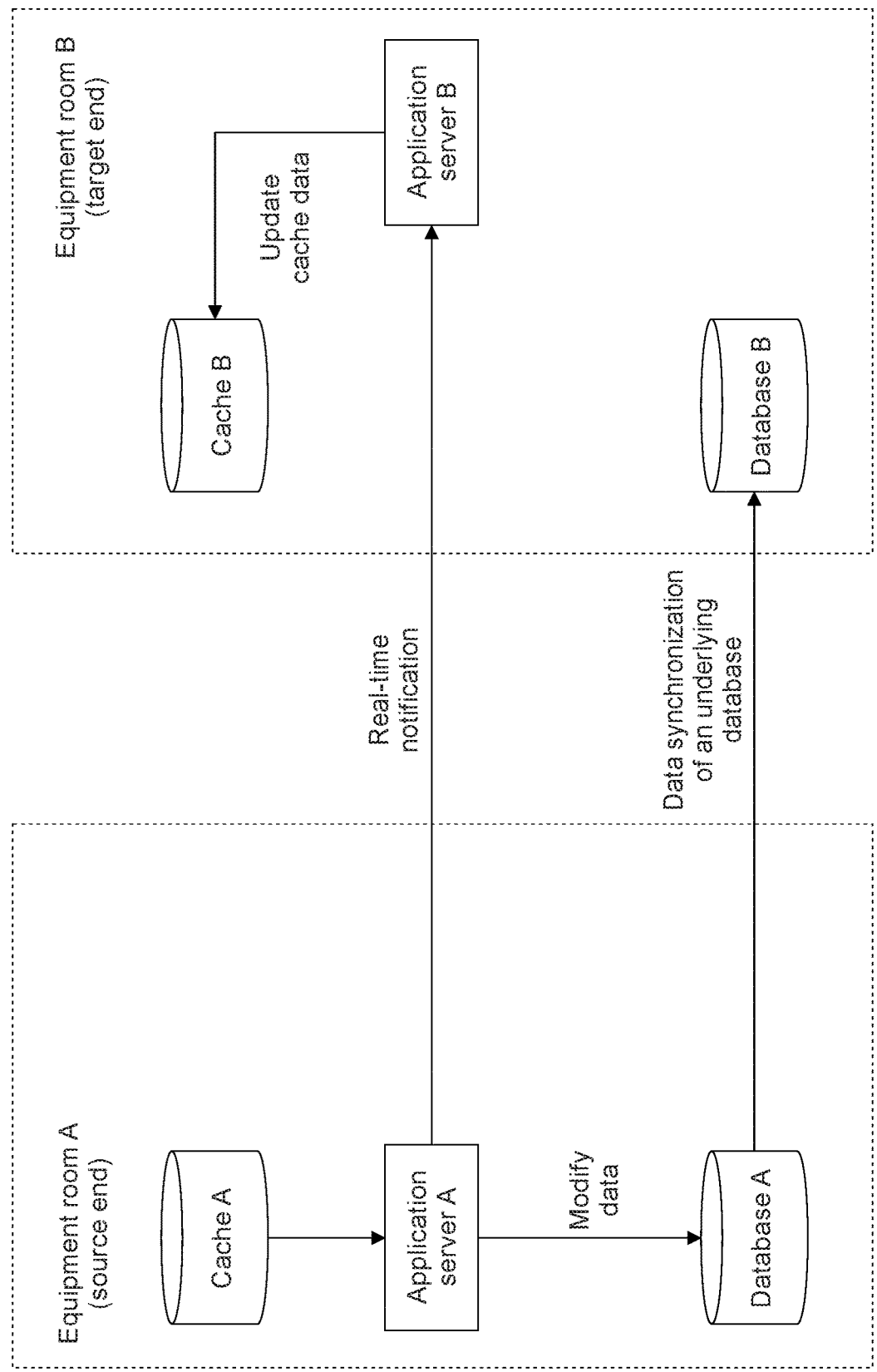
FIG. 4 is a second schematic structural diagram illustrating an active-active system according to the present application.

It can be understood that, in an actual application design, all related functional modules of a synchronization apparatus can be located in a physical entity (for example, a dedicated server) that is relatively independent of an application server, as shown in FIG. 3. Alternatively, some or all of the functional modules can be located in an application server. When all the functional modules of each synchronization apparatus are located in an application server, in essence, the functions of the synchronization apparatus on each side of the data synchronization source end and the data synchronization target end are integrated into the application server on the corresponding side, a corresponding system architecture can be simplified as shown in FIG. 4. Interaction between a synchronization apparatus and an application server is simplified as internal interaction in the application server.

In the technical solution provided in the present application, a real-time notification is introduced to reduce an update delay of a cache in a data synchronization target end database without too much adjustment on the primitive data synchronization solution of the underlying database. In addition, an update operation of a local cache at the data synchronization source end can be directly implemented by using the existing technical solution, and it is basically irrelevant to the update delay of the cache in the data synchronization target end database. Therefore, no further description is provided in the present application.

It should be noted that, based on the systems shown in FIG. 3 and FIG. 4, a typical configuration solution is that database A is a write database and database B is a read database. Certainly, there is no necessary connection between the solution in the present application and a read/write separation mechanism of a database. For example, database A and database B are both write databases; or a write database and a read database are deployed in one equipment room, and a read database is deployed in another equipment room. It does not affect implementation of the solution in the present application.

The following further describes in detail the data synchronization method provided in the present application with reference to a specific implementation.

Figure 5:
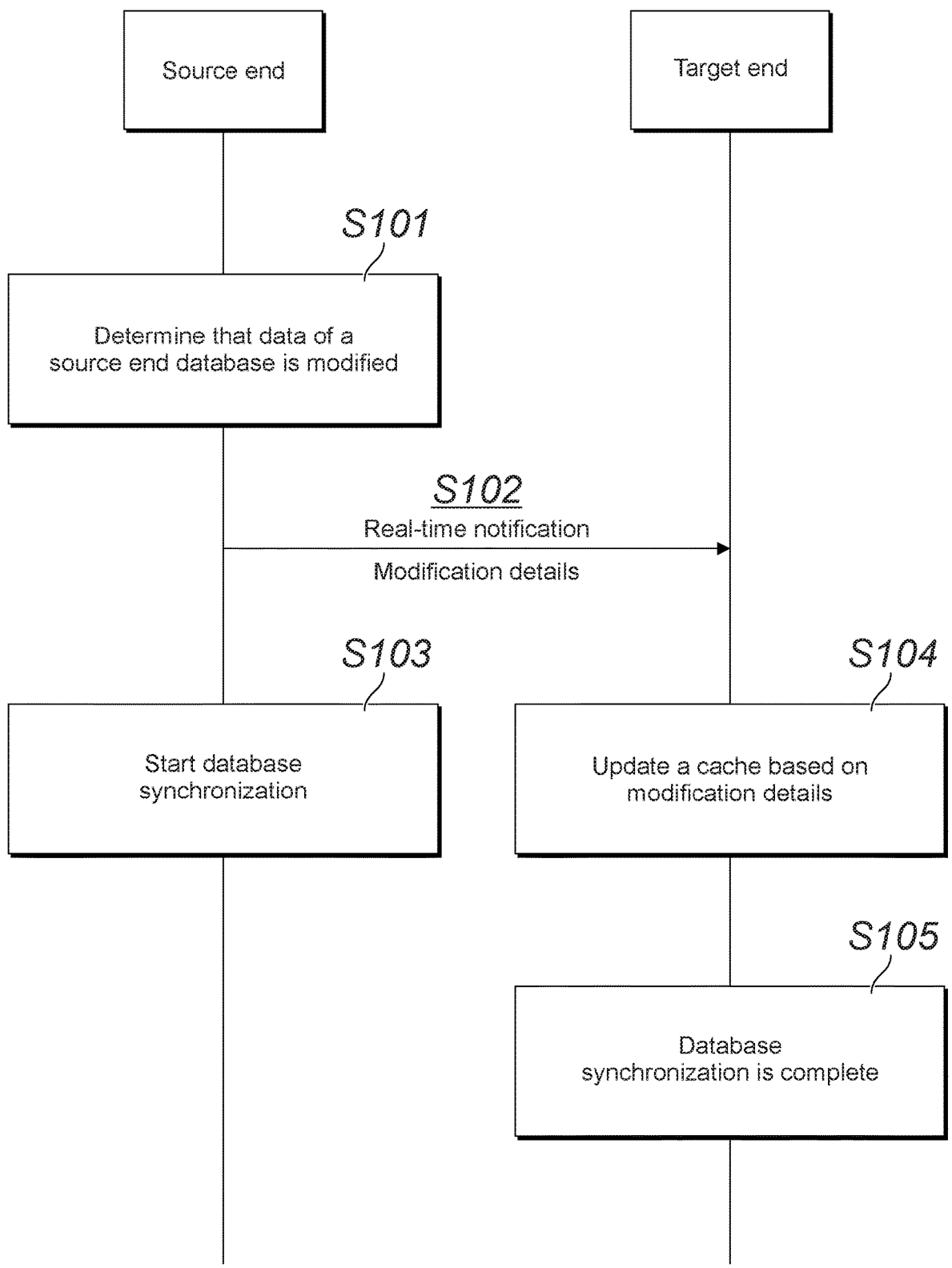
FIG. 5 is a first schematic flowchart illustrating a data synchronization method according to the present application.

FIG. 5 shows a data synchronization procedure of applying a solution in the present application to an active-active system. For ease of description, the following implementation describes the whole procedure with reference to the simplified system architecture shown in FIG. 4.

S101. A data synchronization source end determines that data of a source end database is modified.

The data modification can be determined after application server A sends a data write request to database A, or after it is determined that data has been successfully written to database A. The former method can further reduce a delay of the whole procedure theoretically, and the latter method can avoid a situation that data fails to be written to a data synchronization source end database. Consequently, an update of a cache at a data synchronization target end is inconsistent with that in the database. It can be flexibly set by a person skilled in the art based on factors such as system stability and an application scenario.

S102. The data synchronization source end generates a real-time notification for this data modification and sends the real-time notification to a data synchronization target end.

In this implementation, application server A writes data modification details corresponding to each data write operation performed on database A to the real-time notification. In essence, the modification details are written to a message body corresponding to the real-time notification. The modification details here should include at least modified value information, for example, {Zhang San, male, 20}. As agreed based on an actual data storage format of a database and data transmission methods of data on two sides, the details can further include information such as a data table identifier, a row identifier, and a column identifier related to the modification, for example, {name="Zhang San", age="20"}. The present application does not limit specific content of the "modification details". After being generated, the real-time notification is immediately sent to the data synchronization target end.

It can be understood that in a process of generating and sending the real-time notification, compression, encryption, or another coding scheme can be further used to improve transmission efficiency, encrypted transmission, etc. This implementation of the present application does not limit a specific generation and transmission method of the real-time notification.

In addition, as a contrast, after application server A writes data successfully to database A in S103, database A starts to initiate a synchronization operation on the database for this modification. It should be noted that, for the data synchronization source end, steps S102 and S103 are two relatively independent operations. Therefore, the sequence of performing the two steps is not limited. For the data synchronization target end, step 104 is performed after the real-time notification is received.

S104. The data synchronization target end obtains data modification details by parsing the real-time notification, and directly updates a cache in a target end database based on a parsing result.

At the data synchronization target end, application server B performs real-time detection on a real-time notification receiving port. After the real-time notification is received, application server B parses it immediately. Based on the processing of the real-time notification performed by application server A, application server B may need to perform corresponding operations such as decompression and decryption during parsing. Details are not described here.

In this implementation, after obtaining the data modification details of database A by parsing the real-time notification, application server B directly updates cache B in the local database based on the parsing result. Because data is not transmitted in real time to a remote location during synchronization of data of an underlying database, but is packed and transmitted in batches after the number of modified data blocks reaches a certain value, an average transmission speed of the real-time notification is higher than a synchronization speed of the underlying database. As shown in S105 in FIG. 4, usually, the data synchronization target end can directly update the local cache based on the real-time notification before synchronization of the underlying database is completed. Tests show that in a remote active-active system with a distance of about 1000 km, a synchronization average delay of an underlying database is about 3 s. A synchronization update delay of cache data can be reduced to about 30 ms or even lower through a real-time notification, and the speed of database cache synchronization can be improved significantly.

It should be noted that application server B sends an update message to a cache server immediately after the real-time notification is received to perform an update operation. However, after receiving the update message, the cache server can further determine whether cache data needs to be updated based on an actual situation. For example, the determining can be performed based on a timestamp for writing the data, or some other information can be included in a notification message to determine whether to update a cache based on the information. For example, version number information can be included so that a version number can be viewed to determine whether a cache needs to be updated. In essence, in some situations, although application server B performs an update operation, whether cache data is finally successfully updated needs to be determined by the cache server. This update method does not affect implementation of the solution in the present application.

In the previous implementation, the data synchronization source end adds the modification details of the local database to the real-time notification and uses a low delay characteristic of the real-time notification, so the data synchronization target end can complete a synchronization update of the cache in the local database before synchronization of the underlying database is completed. However, in an actual application, an amount of information that can be transmitted in the real-time notification can be limited by a plurality of objective factors such as transmission bandwidth and a storage capacity of a notification message center. If an amount of data modified by the data synchronization source end at a time is too large, it is difficult to transmit these modification details to the data synchronization target end through a real-time notification. The present application provides a corresponding solution for this situation. The previous real-time notification can be transferred by using a message system. For example, an existing message system can be used or a dedicated message system can be established. A structure and a form of the message system are not limited.

Figure 6:
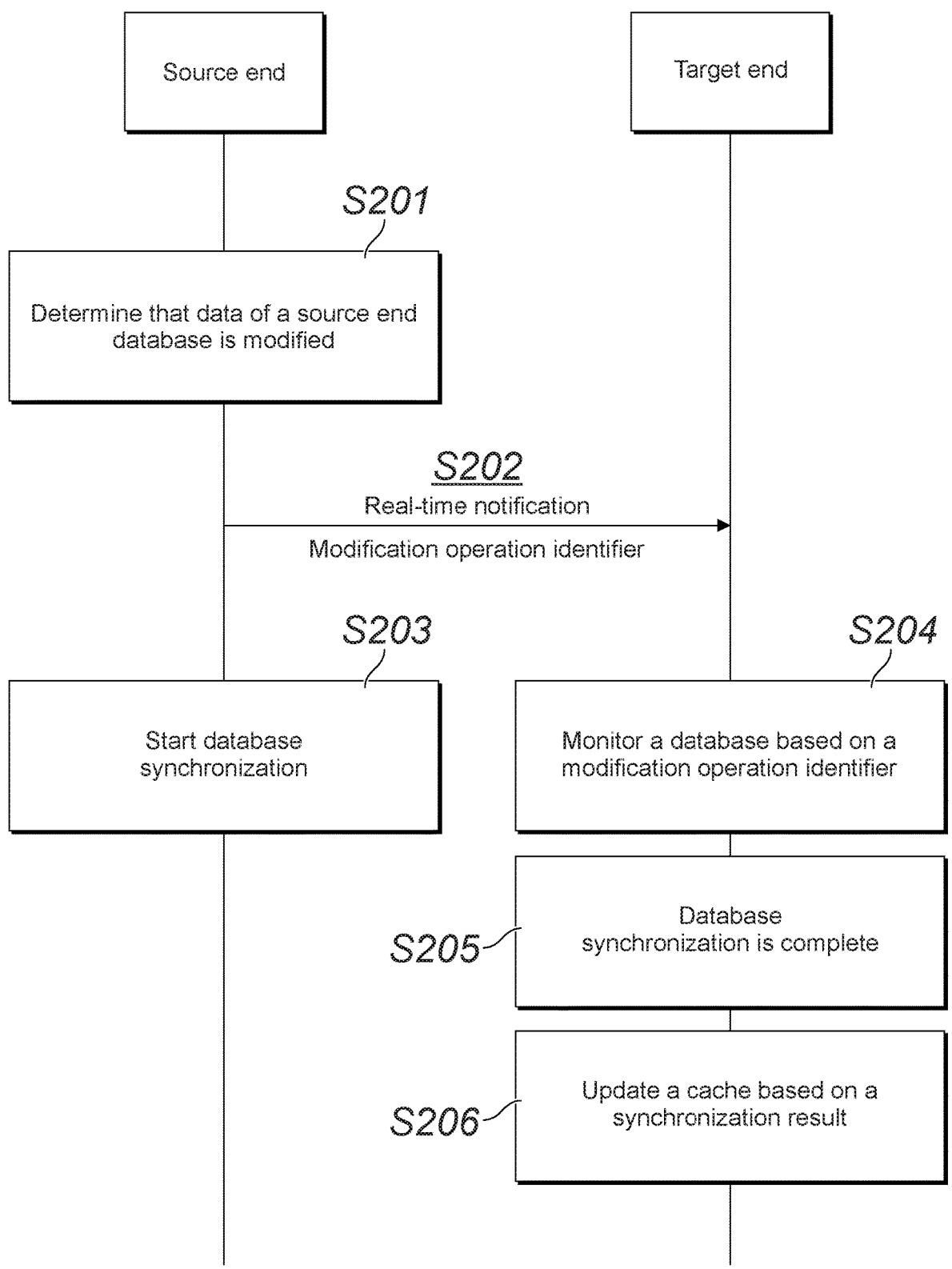
FIG. 6 is a second schematic flowchart illustrating a data synchronization method according to the present application.

FIG. 6 shows another data synchronization procedure of applying a solution in the present application to an active-active system. For ease of description, the following implementation describes the whole procedure with reference to the system architecture shown in FIG. 3.

S201. A data synchronization source end determines that data of a source end database is modified.

The present step is similar to S101. Details are not described in this implementation again.

S202. The data synchronization source end generates a real-time notification for this data modification and sends the real-time notification to a data synchronization target end.

When application server A performs a data write operation on database A, identifier information is generated for each write operation. For example, the identifier information can be a sequence number or an identifier character string generated by using a specific algorithm. When a write request is initiated to database A, application server A submits details (such as a value, a data table identifier, a row identifier, and a column identifier) of data that needs to be modified together with the identifier information to database A. In this implementation, because of a limited bearer capability of a real-time notification message body, application server A writes the identifier information to the real-time notification. After being generated, the real-time notification is immediately sent to the data synchronization target end.

S203. After application server A writes data successfully to database A, database A starts to initiate a synchronization operation on the database for this modification. In a synchronization process, identifier information of the previous modification is also transmitted to database B together with specific data modification content.

Similar to the previous implementation, for the data synchronization source end, steps S202 and S203 are two relatively independent operations. Therefore, the sequence of performing the two steps is not limited. For the data synchronization target end, step 204 is performed after the real-time notification is received.

S204. The data synchronization target end obtains a data modification operation identifier by parsing the real-time notification and monitors a target end database based on a parsing result.

At the data synchronization target end, application server B performs real-time detection on a real-time notification receiving port. After the real-time notification is received, application server B parses it immediately. In this implementation, after obtaining, by parsing the real-time notification, an operation identifier of modification performed by the source end on database A. Application server B starts to monitor database B for the identifier.

S205. Synchronization from the data synchronization source end to an underlying database of the data synchronization target end is complete.

S206. The data synchronization source end updates a cache in the target end database based on synchronized content of the target end database.

After detecting, through monitoring, that a modification operation corresponding to the identifier has been synchronized from database A to database B, the application server reads corresponding data from database B and updates cache B in the local database based on the reading result.

Because a real-time notification transmission speed is higher than a synchronization speed of the underlying database, after receiving the real-time notification, application server B can usually update cache B after a period of time. In contrast to the previous implementation, in this implementation, the data synchronization target end can update the local cache only after synchronization of the underlying database is completed. However, the real-time notification is used so that the data synchronization target end can learn in advance that the underlying database is to be modified. Through monitoring, a cache can be updated by obtaining data immediately after the synchronization is completed. Therefore, a cache synchronization update delay can still be reduced to some extent compared with the existing technical solution.

The two data synchronization methods described in the previous implementations can reduce a synchronization update delay of a cache at the data synchronization target end at different levels. When a capacity of a real-time notification is not limited, the first solution can be selected to deliver a relatively low delay. In an actual application, an amount of data in a database to be modified by the application server is usually uncertain. A customer information file (CIF) system is used as an example. A data volume of modifying personal user information is relatively small. For a large account associated with a large number of sub-accounts, a modification operation can involve change of data in a large number of sub-accounts. The present application further provides an adaptive data synchronization solution for this situation:

After determining that the data of the source end database is modified, the data synchronization source end first determines whether a data volume of this modification exceeds a predetermined threshold. The threshold is determined based on a bearer capability of the real-time notification, and the bearer capability of the real-time notification depends on factors such as transmission bandwidth and a storage capacity of a notification message center. Certainly, the threshold can be further determined based on factors such as compression and encoding performed during generation of the real-time notification. In conclusion, if it is determined that the real-time notification can include modification details related to this modification operation, the modification details including at least specific value information related to this modification are written to the real-time notification. If it is determined that the real-time notification cannot include the modification details related to this modification operation, only an operation identifier of this modification is written to the real-time notification.

After receiving the real-time notification, the data synchronization target end first parses the real-time notification. If the parsing result includes the specific value information related to the modification, the cache in the target end database is directly updated based on the parsing result; otherwise, the target end database is monitored based on the modification operation identifier obtained by parsing. When it is detected that a modification operation corresponding to the identifier has been synchronized from the source end database to the target end database, the cache in the target end database is updated by obtaining corresponding data from the target end database.

In the previous solution, the data synchronization source end adaptively generates a real-time notification that includes different content based on a data volume related to the modification. As such, for small-scale data modification, the data synchronization target end can update data in the local cache without waiting for completion of synchronization of the underlying database. For large-scale data modification, data in the local cache can be updated immediately after synchronization is completed.

It can be understood that the synchronization update process of the cache for only one data modification is shown in the previous implementations. For continuous data modifications, the previous procedure needs to be repeated. In addition, only the active-active system is used as an example for description in the previous implementations. For a multi-active system that includes at least three data centers, a cache update procedure of a data synchronization source end and data synchronization target ends is similar. The implementation details of the present application are not repeated here.

Figure 7:
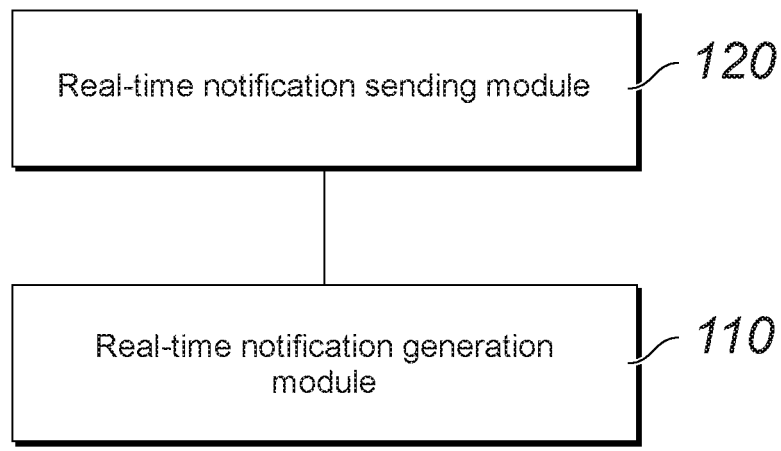
FIG. 7 is a schematic structural diagram illustrating a data synchronization source end apparatus according to the present application.

The present application further provides a data synchronization source end apparatus. As shown in FIG. 7, the apparatus can include a real-time notification generation module 110 and a real-time notification sending module 120.

The real-time notification generation module 110 is configured to generate a real-time notification for this data modification after it is determined that data of a source end database is modified, where the real-time notification includes information related to this data modification.

The real-time notification sending module 120 is configured to send the real-time notification to a data synchronization target end. Thus, after receiving the real-time notification, the data synchronization target end obtains the data modification related information by parsing the real-time notification and updates a cache in a target end database based on a parsing result.

In a specific implementation of the present application, the real-time notification generation module 110 can be specifically configured to write specific value information related to this modification to the real-time notification after it is determined that the data of the source end database is modified.

In a specific implementation of the present application, the real-time notification generation module 110 can be specifically configured to write an operation identifier of this modification to the real-time notification after it is determined that the data of the source end database is modified.

In a specific implementation of the present application, the real-time notification generation module 110 can be specifically configured to determine whether a data volume of this modification exceeds a predetermined threshold after it is determined that the data of the source end database is modified; and if no, write specific value information related to this modification to the real-time notification; or if yes, write an operation identifier of this modification to the real-time notification.

In a specific implementation of the present application, the data synchronization source end apparatus can be disposed in a data synchronization source end application server.

Figure 8:
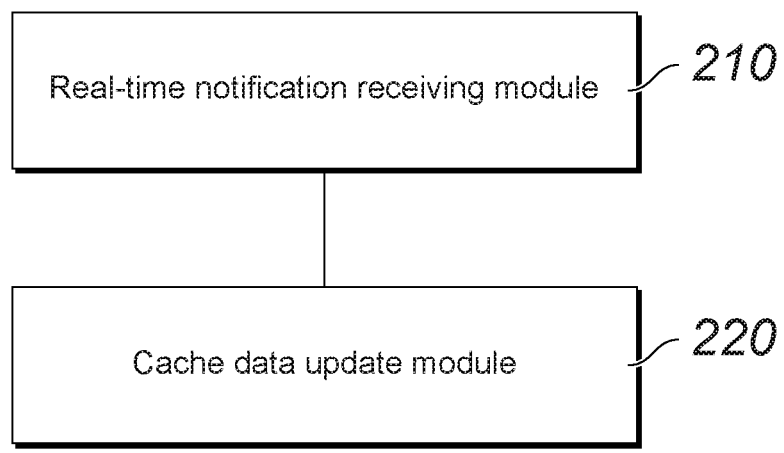
FIG. 8 is a schematic structural diagram illustrating a data synchronization target end apparatus according to the present application.

The present application further provides a data synchronization target end apparatus. As shown in FIG. 8, the apparatus can include a real-time notification receiving module 210 and a cache data update module 220.

The real-time notification receiving module 210 is configured to receive a real-time notification sent by a data synchronization source end.

The cache data update module 220 is configured to obtain data modification related information by parsing the real-time notification and update a cache in a target end database based on a parsing result.

After the data synchronization source end determines that data of a source end database is modified, the real-time notification is generated and sent for this data modification, and the real-time notification includes information related to this data modification.

In a specific implementation of the present application, the real-time notification can include specific value information related to this modification.

Correspondingly, the cache data update module 220 can be specifically configured to directly update the cache in the target end database based on the modification related specific value information obtained by parsing.

In a specific implementation of the present application, the real-time notification can include an operation identifier of this modification.

Correspondingly, the cache data update module 220 can be specifically configured to monitor the target end database based on the modification operation identifier obtained by parsing, and when it is detected that a modification operation corresponding to the identifier has been synchronized from the source end database to the target end database, update the cache in the target end database based on synchronized content of the target end database.

In a specific implementation of the present application, the real-time notification can include specific value information related to this modification or an operation identifier of this modification.

Correspondingly, the cache data update module 220 can be specifically configured to directly update the cache in the target end database based on the parsing result if the parsing result is modification related specific value information; or if the parsing result is a modification operation identifier, monitor the target end database based on the identifier, and when it is detected that a modification operation corresponding to the identifier has been synchronized from the source end database to the target end database, update the cache in the target end database based on synchronized content of the target end database.

In a specific implementation of the present application, the data synchronization target end apparatus can be disposed in a data synchronization target end application server.

Figure 9:
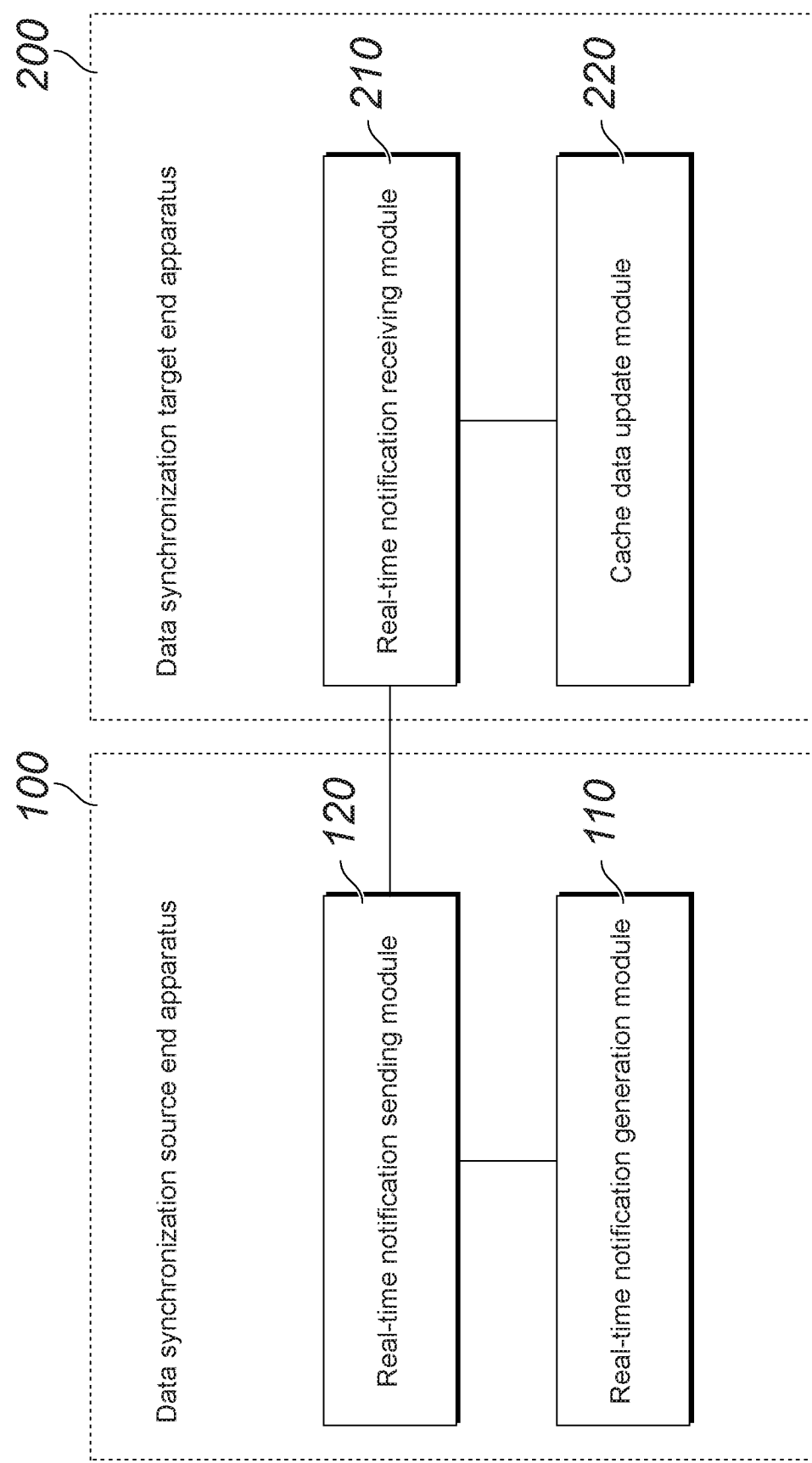
FIG. 9 is a schematic structural diagram illustrating a data synchronization system according to the present application.

The present application further provides a data synchronization system. As shown in FIG. 9, the system can include a data synchronization source end apparatus 100 and a data synchronization target end apparatus 200.

The data synchronization source end apparatus 100 can include a real-time notification generation module 110 and a real-time notification sending module 120.

The real-time notification generation module 110 is configured to generate a real-time notification for this data modification after it is determined that data of a source end database is modified, where the real-time notification includes information related to this data modification.

The real-time notification sending module 120 is configured to send the real-time notification to a data synchronization target end.

The data synchronization target end apparatus 200 can include a real-time notification receiving module 210 and a cache data update module 220.

The real-time notification receiving module 210 is configured to receive the real-time notification.

The cache data update module 220 is configured to obtain data modification related information by parsing the real-time notification and update a cache in a target end database based on a parsing result.

In a specific implementation of the present application, the real-time notification generation module 120 can be specifically configured to write specific value information related to this modification to the real-time notification after it is determined that the data of the source end database is modified.

Correspondingly, the cache data update module 220 can be specifically configured to directly update the cache in the target end database based on the modification related specific value information obtained by parsing.

In another specific implementation of the present application, the real-time notification generation module 120 can be specifically configured to write an operation identifier of this modification to the real-time notification after it is determined that the data of the source end database is modified.

Correspondingly, the cache data update module 220 can be specifically configured to monitor the target end database based on the modification operation identifier obtained by parsing, and when it is detected that a modification operation corresponding to the identifier has been synchronized from the source end database to the target end database, update the cache in the target end database based on synchronized content of the target end database.

In another specific implementation of the present application, the real-time notification generation module 120 can be specifically configured to determine whether a data volume of this modification exceeds a predetermined threshold after it is determined that the data of the source end database is modified; and if no, write specific value information related to this modification to the real-time notification; or if yes, write an operation identifier of this modification to the real-time notification.

Correspondingly, the cache data update module 220 can be specifically configured to directly update the cache in the target end database based on the parsing result if the parsing result is modification related specific value information; or if the parsing result is a modification operation identifier, monitor the target end database based on the identifier, and when it is detected that a modification operation corresponding to the identifier has been synchronized from the source end database to the target end database, update the cache in the target end database based on synchronized content of the target end database.

For an implementation process of functions and roles of each module in the apparatus, refer to an implementation process of a corresponding step in the previous method. Details are not described here again.

In an actual application design, all related functional modules of the data synchronization source end apparatus and the data synchronization target end apparatus can be separately located in physical entities (for example, dedicated servers) that are relatively independent of the application servers, as shown in FIG. 3. Alternatively, some or all of the functional modules can be located in the application servers. When all the functional modules of the synchronization apparatuses are located in the application servers, in essence, the functions of the synchronization apparatuses on both sides of the data synchronization source end and the data synchronization target end are integrated into the application servers on the both sides, a corresponding system architecture can be simplified as shown in FIG. 4, and interaction between the synchronization apparatuses and the application servers is simplified as internal interaction in the application servers.

Figure 10:
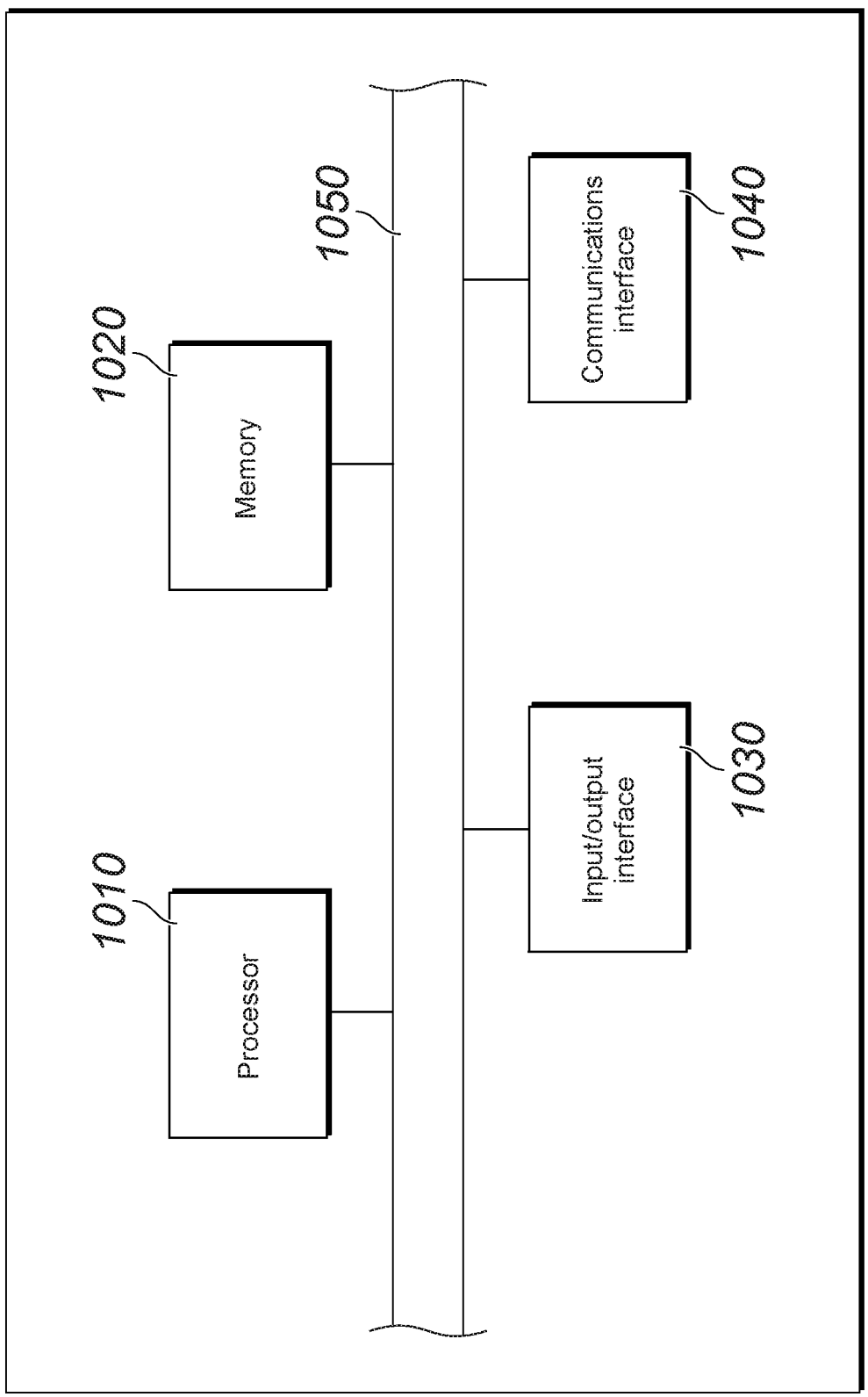
FIG. 10 is a schematic structural diagram illustrating a device for configuring an apparatus according to the present application.

The data synchronization source end apparatus and the data synchronization target end apparatus provided in the present application can be separately disposed on a hardware device such as a server. FIG. 10 is a schematic diagram illustrating a hardware structure of a device for configuring the previous apparatus according to the present application. The device can include a processor 1010, a memory 1020, an input/output interface 1030, a communications interface 1040, and a bus 1050. The processor 1010, the memory 1020, the input/output interface 1030, and the communications interface 1040 implement mutual communication connections in the device by using the bus 1050.

The processor 1010 can be a general-purpose central processing unit (CPU), a microprocessor, an application specific integrated circuit (ASIC), or one or more integrated circuits, configured to execute a related program to implement the technical solution provided in the present application.

The memory 1020 can be implemented in a form of a read only memory (ROM), a random access memory (RAM), a static storage device, a dynamic storage device, etc. The memory 1020 can store an operating system and another application program. When the technical solutions provided in the present application are implemented by using software or firmware, related program code is stored in the memory 1020 and is invoked and executed by the processor 1010.

The input/output interface 1030 is configured to connect to an input/output module to implement information input and output. The input/output module can be configured as a component (not shown in the figure) in the device, or it can be connected to the device to provide a corresponding function. An input device can include a keyboard, a mouse, a touchscreen, a microphone, a sensor, etc. An output device can include a display, a loudspeaker, a vibrator, an indicator, etc.

The communications interface 1040 is configured to connect to a communications module (not shown in the figure) so as to implement communication and interaction between the present device and another device. The communications module can implement communication in a wired manner (such as a USB or a network cable), or it can implement communication in a wireless manner (such as a mobile network, Wi-Fi, or Bluetooth).

The bus 1050 includes a channel for transmitting information between components (such as the processor 1010, the memory 1020, the input/output interface 1030, and the communications interface 1040) of the device.

It should be noted that although only the processor 1010, the memory 1020, the input/output interface 1030, the communications interface 1040, and the bus 1050 of the previous device are shown, in a specific implementation process, the device can further include another component essential for normal running. In addition, a person skilled in the art can understand that the device can include only components necessary for implementing the solutions in the present application, and it does not necessarily include all components shown in the figure.

It can be learned from descriptions of the implementations that a person skilled in the art can understand that the present application can be implemented by using software in addition to a necessary universal hardware platform. Based on such an understanding, the technical solutions in the present application essentially or the part contributing to the existing technology can be implemented in a form of a software product. The software product can be stored in a storage medium, such as a ROM/RAM, a magnetic disk, or an optical disc, and includes several instructions for instructing a computer device (a personal computer, a server, or a network device) to perform the methods described in the implementations or in some parts of the implementations of the present application.

The implementations in the present specification are described in a progressive manner. For same or similar parts in the implementations, refer to each other. Each implementation focuses on a difference from other implementations. Particularly, an apparatus or system implementation is similar to a method implementation, and therefore is described briefly. For related parts, refer to related descriptions in the method implementation. The described apparatus or system implementations are merely examples. The modules described as separate parts can be physically separate or not. When the solutions in the present application are implemented, the functions of each module can be implemented in one or more pieces of software and/or hardware. Some or all the modules can be selected based on actual needs to achieve the objectives of the solutions of the implementations. A person of ordinary skill in the art can understand and implement the implementations of the present application without creative efforts.

The previous descriptions are merely specific implementations of the present application. It should be noted that a person of ordinary skill in the art can make several improvements or polishing without departing from the principle of the present application and the improvements or polishing shall fall within the protection scope of the present application.

Figure 11:
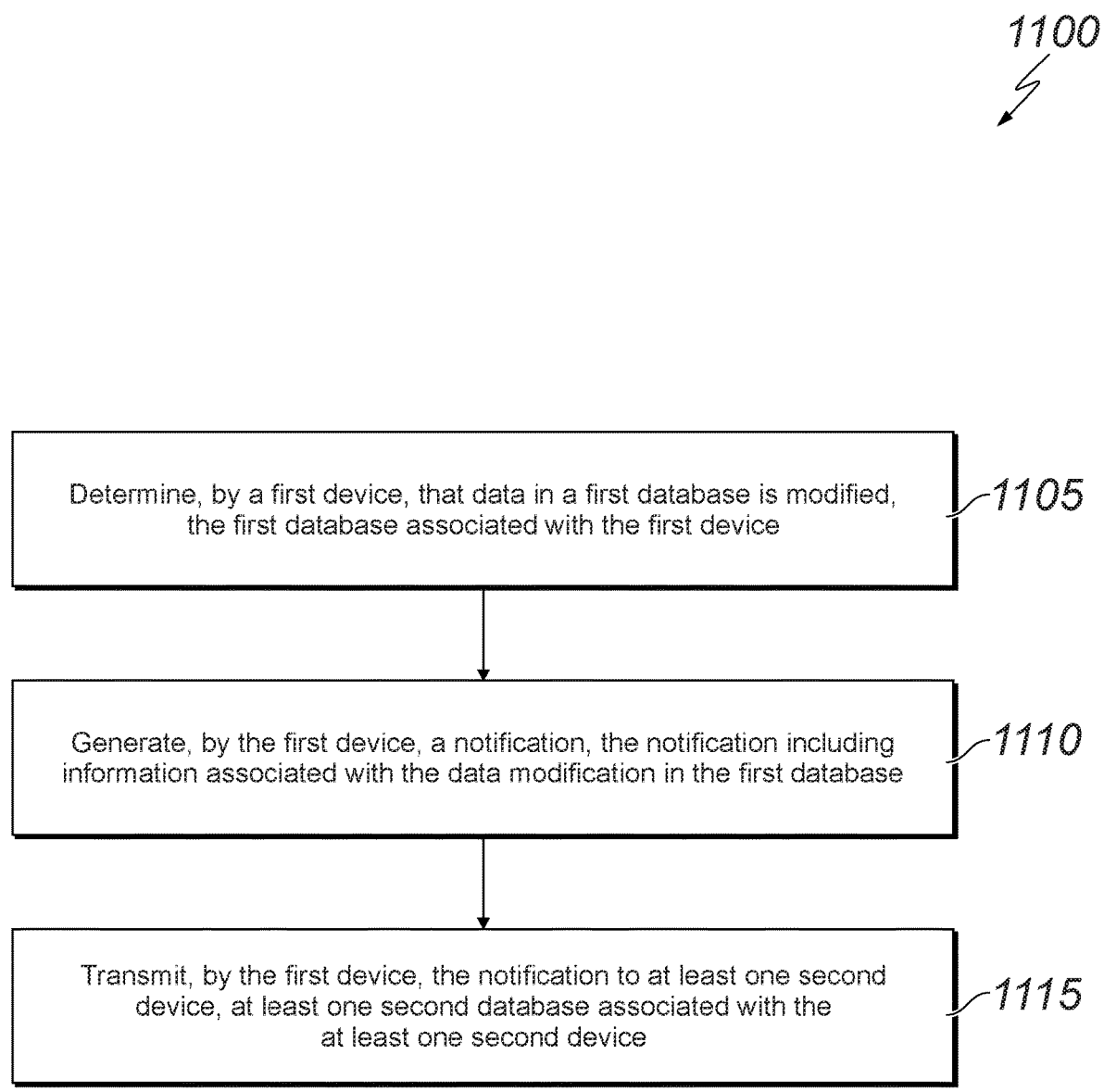
FIG. 11 is a flowchart illustrating an example of a computer-implemented method for data synchronization, according to an implementation of the present disclosure.

FIG. 11 is a flowchart illustrating an example of a computer-implemented method 1100 for data synchronization, according to an implementation of the present disclosure. For clarity of presentation, the description that follows generally describes method 1100 in the context of the other figures in this description. However, it will be understood that method 1100 can be performed, for example, by any system, environment, software, and hardware, or a combination of systems, environments, software, and hardware, as appropriate. In some implementations, various steps of method 1100 can be run in parallel, in combination, in loops, or in any order.

At 1105, a determination is made, by a first device, that data in a first database is modified. The first database is associated with the first device. In some implementations, the first database and at least one second database are part of a distributed multi-active data center. Data modified in the first database will be synchronized in the at least one second database. For example, the first database and the at least one second database can be located in different places (such as, different cities). In some implementations, the first device can be located in an application server. The application server can interact with the first database (such as, perform a read or write operation on the first database). In some implementations, the first device can be a dedicated server different from the application server. The determination can be made, for example, when the application server transmits a data write request to the first database, or when data has been written to the first database successfully. In some implementations, a first cache is associated with the first database. Data modified in the first database will be updated in the first cache simultaneously or substantially simultaneously. From 1105, method 1100 proceeds to 1110.

At 1110, a notification is generated by the first device. The notification includes information associated with the data modification in the first database. In some implementations, the notification is a real-time data modification notification that is automatically generated at the same time (or substantially the same time) the determination is made. In some cases, detailed information associated with the data modification can be written into the notification. For example, for a data write request to the first database, detailed information of the data to be written to the first database can be included in the notification. The detailed information of the data to be written to the first database can include one or more of data value (such as, {Zhang San, male, 20}), first database identifier, row identifier, and column identifier (such as, name="Zhang San", age="20"). In some cases, an identifier information can be generated for the data modification and written into the notification. For example, the identifier information can be a sequence number or an identifier character string generated using a predetermined algorithm.

In some implementations, to generate a notification, a determination is made first as to whether a size of the data modification exceeds a predetermined threshold. For example, the predetermined threshold can be set to 8 k bytes. In response to a determination that the size of the data modification does not exceed the predetermined threshold, the notification can be generated to include detailed information of the data modification (such as, writing the detailed information into the notification). In other words, size of the detailed information is less than or equal to the predetermined threshold, and the detailed information can be written in the notification. Otherwise, in response to a determination that the size of the data modification does exceed the predetermined threshold, the notification can be generated to include an operation identifier of the data modification. In other words, size of the detailed information is greater than the predetermined threshold, and the detailed information cannot be written in the notification. Size of the operation identifier is less than or equal to the predetermined threshold, and the operation identifier can be written in the notification. From 1110, method 1100 proceeds to 1115.

At 1115, the notification is transmitted by the first device to at least one second device. At least one second database is associated with the at least one second device. In some implementations, the notification is automatically transmitted at the same time (or substantially the same time) the notification is generated. In some cases, the notification is automatically transmitted when the data in the first database is modified successfully. The notification can be compressed, encrypted, or processed with any appropriate coding scheme before transmission. In some implementations, at least one second cache is associated with the at least one second database. Data modified in the at least one second database will be updated in the at least one second cache simultaneously or substantially simultaneously.

In some implementations, after the data modification in the first database is completed (such as, data has been written to the first database successfully), the at least one second database is synchronized with the first database. For example, the at least one second database is updated to include the data modification so that the at least one second database contains the same content as the first database. In some implementations, the notification is transmitted through a communication link that is different from a communication link through which the at least one second database is synchronized with the first database. In some cases, the notification is transmitted through the same communication link through which the at least one second database is synchronized with the first database.

In some implementations, after the notification is transmitted by the first device to the at least one second device, the notification is received by the at least one second device from the first device. At least one second cache can be updated by the at least one second device and based on the notification. In some cases, if the notification includes detailed information of the data modification, the at least one second cache can be updated directly from the notification (that is, based on the detailed information of the data modification included in the notification). In other words, the at least one second cache can be updated without accessing the at least one second database for synchronized data. In some implementations, updating the at least one second cache directly from the notification can be performed before the at least one second database is synchronized with the data modification in the first database. In some cases, if the notification includes an operation identifier of the data modification, but not the detailed information of the data modification, the at least one second database can be monitored for activities associated with the operation identifier (such as, a synchronization operation associated with the operation identifier). When a synchronization operation associated with the operation identifier is detected in the at least one second database (such as, the at least one second database has been synchronized with the first database), the at least one second cache can be updated based on the synchronized data in the at least one second database. For example, after the synchronization operation is completed, the synchronized data in the at least one second database can be used to update the at least one second cache. In other words, the at least one second cache is updated with accessing the at least one second database for synchronized data. After 1115, method 1100 stops.

A distributed multi-active data center has multiple databases to provide data service in parallel. Normally, a data modification in one database will be synchronized in other databases. Cache of the other databases can be updated only after the other databases have been synchronized with the one database. As a result, updating cache of the other databases is delayed. The subject matter described in this specification can be used to provide real-time cache updates in a distributed multi-active data center. For example, in addition to synchronizing other databases after one database is modified, a notification mechanism is introduced to provide real-time modification updates to the other databases. As a result, instead of waiting for a synchronization operation to be completed, cache of the other databases can be updated directly from a real-time notification. In doing so, cache update delay is reduced, thereby improving data synchronization efficiency in the distributed multi-active data center and user experience when using the distributed multi-active data center, for example, to modify user information.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   determining, by a first device, that data in a first database is modified, wherein the first database is associated with the first device;
   generating, by the first device, a real-time notification for the data modification, wherein the real-time notification includes information associated with the data modification in the first database;
   transmitting, by the first device, the real-time notification to at least one second device once the real-time notification is generated by the first device, wherein at least one second database is associated with the at least one second device;
   initiating synchronization of the at least one second database with the first database after the data modification in the first database is completed;
   receiving, by the at least one second device, the real-time notification from the first device; and
   updating, by the at least one second device, at least one cache based on the received real-time notification before the synchronization of the at least one second database is completed, wherein the at least one cache is associated with the at least one second database, and wherein updating the at least one cache includes:
      in response to determining that the real-time notification includes the data modification, directly updating the at least one cache based on the data modification included in the real-time notification, wherein directly updating the at least one cache based on the data modification included in the real-time notification is performed before the at least one second database is synchronized with the data modification in the first database.

2. The computer-implemented method of claim 1, wherein the data modification in the first database is to be synchronized in the at least one second database.

3. The computer-implemented method of claim 1, wherein generating, by the first device, the real-time notification includes:
   determining whether a size of the data modification exceeds a predetermined threshold;
   in response to a determination that the size of the data modification does not exceed the predetermined threshold, generating the real-time notification to include the data modification; and
   in response to a determination that the size of the data modification does exceed the predetermined threshold, generating the real-time notification to include an operation identifier associated with the data modification in the first database.

4. The computer-implemented method of claim 3, wherein updating, by the at least one second device, the at least one cache based on the real-time notification includes:
   in response to determining that the real-time notification includes the operation identifier associated with the data modification:
      monitoring the at least one second database based on the operation identifier; and
      when a synchronization operation corresponding to the operation identifier is detected in the at least one second database, updating the at least one cache based on synchronized data in the at least one second database.

5. A non-transitory, computer-readable medium storing one or more instructions executable by a computer system to perform operations comprising:
   determining, by a first device, that data in a first database is modified, wherein the first database is associated with the first device;
   generating, by the first device, a real-time notification for the data modification, wherein the real-time notification includes information associated with the data modification in the first database;
   transmitting, by the first device, the real-time notification to at least one second device once the real-time notification is generated by the first device, wherein at least one second database is associated with the at least one second device;
   initiating synchronization of the at least one second database with the first database after the data modification in the first database is completed;
   receiving, by the at least one second device, the real-time notification from the first device; and
   updating, by the at least one second device, at least one cache based on the received real-time notification before the synchronization of the at least one second database is completed, wherein the at least one cache is associated with the at least one second database, and wherein updating the at least one cache includes:
      in response to determining that the real-time notification includes the data modification, directly updating the at least one cache based on the data modification included in the real-time notification, wherein directly updating the at least one cache based on the data modification included in the real-time notification is performed before the at least one second database is synchronized with the data modification in the first database.

6. The non-transitory, computer-readable medium of claim 5, wherein the data modification in the first database is to be synchronized in the at least one second database.

7. The non-transitory, computer-readable medium of claim 5, wherein generating, by the first device, the real-time notification includes:
   determining whether a size of the data modification exceeds a predetermined threshold;
   in response to a determination that the size of the data modification does not exceed the predetermined threshold, generating the real-time notification to include the data modification; and
   in response to a determination that the size of the data modification does exceed the predetermined threshold, generating the real-time notification to include an operation identifier associated with the data modification in the first database.

8. The non-transitory, computer-readable medium of claim 7, wherein updating, by the at least one second device, the at least one cache based on the real-time notification includes:
   in response to determining that the real-time notification includes the operation identifier associated with the data modification:
      monitoring the at least one second database based on the operation identifier; and
      when a synchronization operation corresponding to the operation identifier is detected in the at least one second database, updating the at least one cache based on synchronized data in the at least one second database.

9. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      determining, by a first device, that data in a first database is modified, wherein the first database is associated with the first device;
      generating, by the first device, a real-time notification for the data modification, wherein the real-time notification includes information associated with the data modification in the first database;
      transmitting, by the first device, the real-time notification to at least one second device once the real-time notification is generated by the first device, wherein at least one second database is associated with the at least one second device;
      initiating synchronization of the at least one second database with the first database after the data modification in the first database is completed;
      receiving, by the at least one second device, the real-time notification from the first device; and
      updating, by the at least one second device, at least one cache based on the received real-time notification before the synchronization of the at least one second database is completed, wherein the at least one cache is associated with the at least one second database, and wherein updating the at least one cache includes:
         in response to determining that the real-time notification includes the data modification, directly updating the at least one cache based on the data modification included in the real-time notification, wherein directly updating the at least one cache based on the data modification included in the real-time notification is performed before the at least one second database is synchronized with the data modification in the first database.

10. The computer-implemented system of claim 9, wherein the data modification in the first database is to be synchronized in the at least one second database.

11. The computer-implemented system of claim 9, wherein generating, by the first device, the real-time notification includes:
   determining whether a size of the data modification exceeds a predetermined threshold;
   in response to a determination that the size of the data modification does not exceed the predetermined threshold, generating the real-time notification to include the data modification; and
   in response to a determination that the size of the data modification does exceed the predetermined threshold, generating the real-time notification to include an operation identifier associated with the data modification in the first database.

12. The computer-implemented system of claim 11, wherein updating, by the at least one second device, the at least one cache based on the real-time notification includes:
   in response to determining that the real-time notification includes the operation identifier associated with the data modification:
      monitoring the at least one second database based on the operation identifier; and
      when a synchronization operation corresponding to the operation identifier is detected in the at least one second database, updating the at least one cache based on synchronized data in the at least one second database.

13. The computer-implemented method of claim 1, wherein the first database is a write database and the at least one second database is a read database.

14. The computer-implemented method of claim 1, wherein the real-time notification is compressed, encrypted, or encoded before transmitted to the at least one second device.

15. The non-transitory, computer-readable medium of claim 5, wherein the first database is a write database and the at least one second database is a read database.

16. The non-transitory, computer-readable medium of claim 5, wherein the real-time notification is compressed, encrypted, or encoded before transmitted to the at least one second device.

17. The computer-implemented system of claim 9, wherein the first database is a write database and the at least one second database is a read database.

18. The computer-implemented system of claim 9, wherein the real-time notification is compressed, encrypted, or encoded before transmitted to the at least one second device.

* * * * *